April 18, 1967
J. G. LAVALLEE
3,314,155
MICROMETER
Filed Aug. 2, 1965
2 Sheets-Sheet 1
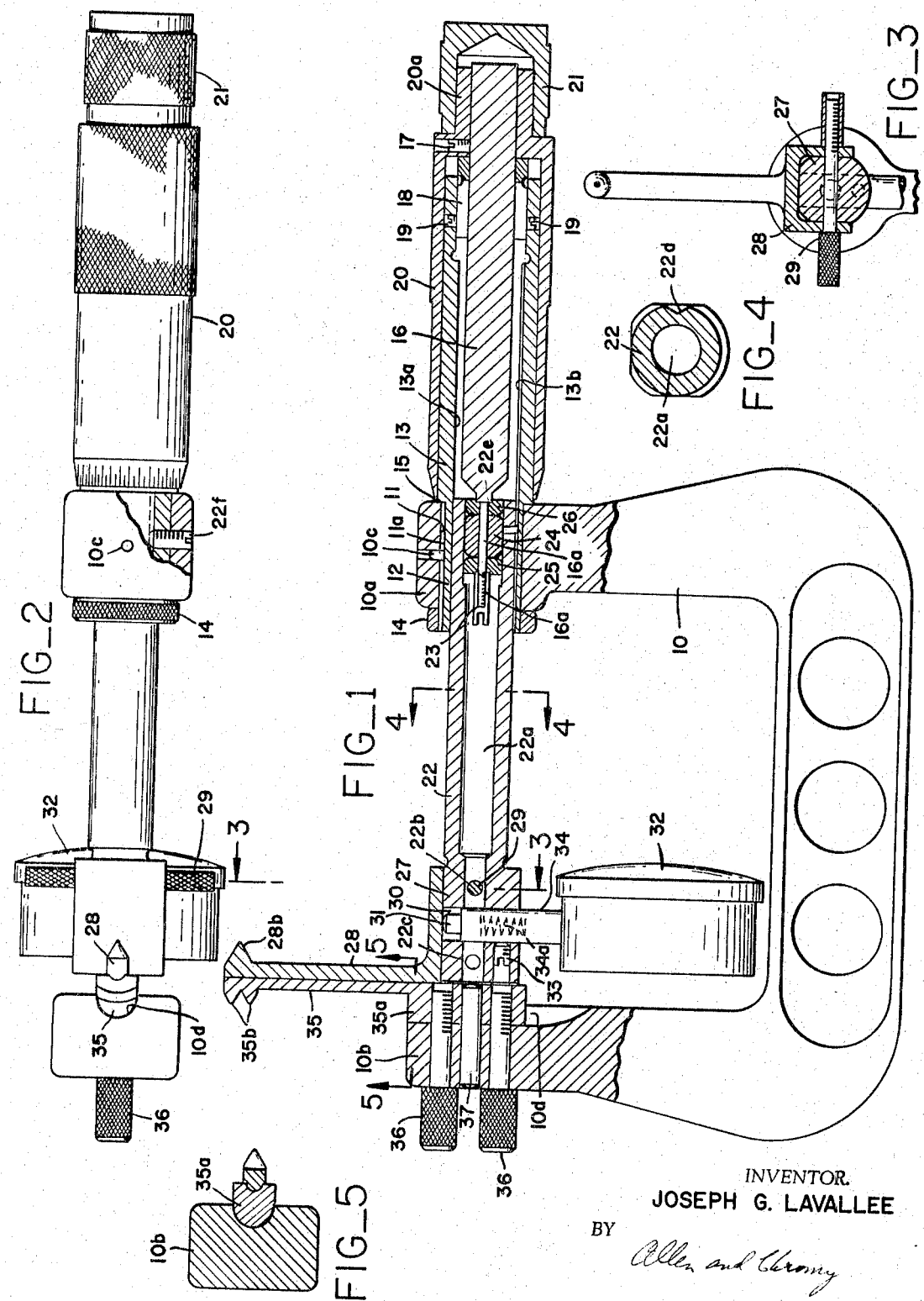
INVENTOR.
JOSEPH G. LAVALLEE
BY
*Allen and Chromy*
ATTORNEYS April 18, 1967 J. G. LAVALLEE 3,314,155
MICROMETER
Filed Aug. 2, 1965 2 Sheets-Sheet 2
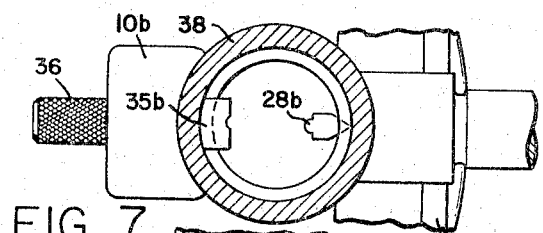
FIG_7
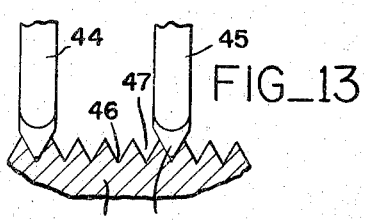
FIG_13
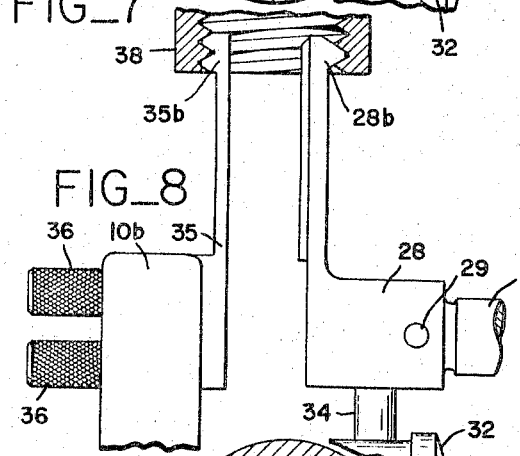
FIG_8
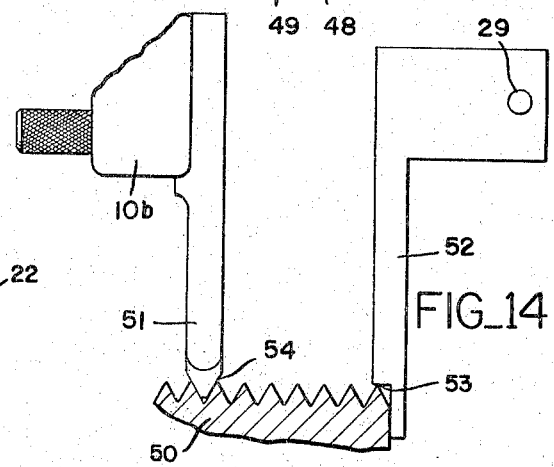
FIG_14
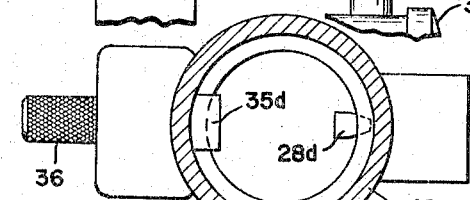
FIG_9
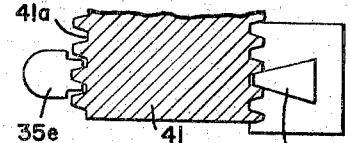
FIG_15 FIG_11
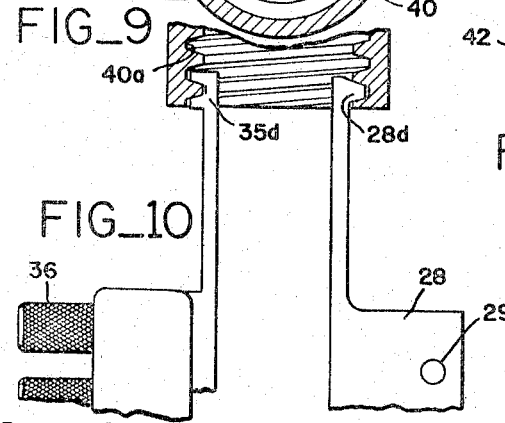
FIG_10
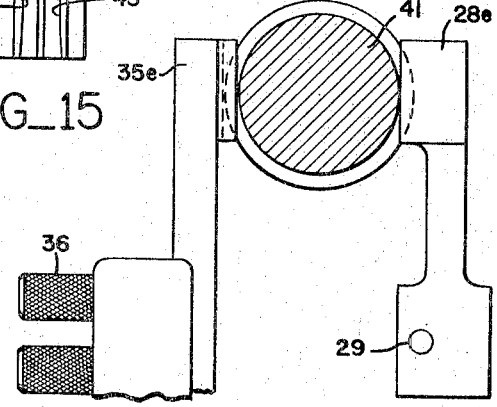
FIG_12
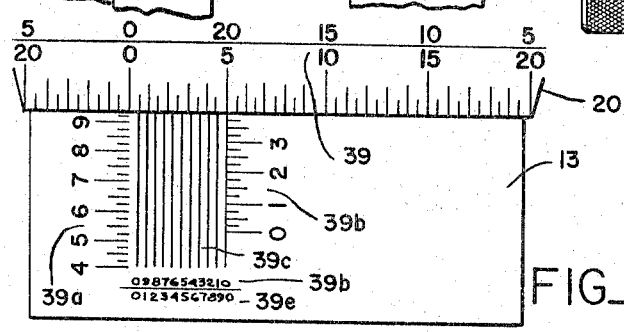
FIG_6
INVENTOR.
JOSEPH G. LAVALLEE
BY Allen and Chrony
ATTORNEYS

United States Patent Office 3,314,155
Patented Apr. 18, 1967

3,314,155
MICROMETER
Joseph G. Lavallee, 58 Steward Ave.,
San Jose, Calif. 95127
Filed Aug. 2, 1965, Ser. No. 476,259
4 Claims. (Cl. 33—147)

This invention relates to a micrometer which is adapted to measure inside and outside diameters of threaded members that are provided with various types of threads as well as the lead angle and helix angle of the thread provided to threaded members and pitch diameter of gear teeth.

An object of this invention is to provide an improved micrometer which is adapted to measure both inside and outside diameters and which can be used to check threads on the true pitch diameter of both inside and outside threads.

Another object of this invention is to provide an improved micrometer which may be made in various sizes up to 6 inches, for example and which is provided with interchangeable segments or anvils, each pair of which serves a special purpose and which may be used interchangeably in the micrometers of different sizes.

Another object of this invention is to provide an improved micrometer with a dial type indicator with which extreme measurement accuracy can be obtained and with which the same accuracy can be obtained by different operators of the micrometer.

Still another object of this invention is to provide an improved micrometer with a visual compensator which indicates to the operator when adequate pressure is applied to the micrometer and when the micrometer is reading the true maximum diameter.

Still another object of this invention is to provide an improved micrometer which may be used to measure the lead angle and the helix angle of a thread.

Still another object of this invention is to provide an improved micrometer which may be used to measure gear for uniformity or pitch diameter.

Other and further objects of this invention will be apparent to those skilled in the art to which it relates from the following specification, claims and drawing in which briefly:

FIG. 1 is a side view partially in section of an embodiment of the micrometer of this invention;

FIG. 2 is a top view also partially in section of this micrometer;

FIG. 3 is a sectional view taken along the line 3—3 of FIG. 1;

FIG. 4 is a sectional view taken along the line 4—4 of FIG. 1;

FIG. 5 is a sectional view taken along the line 5—5 of FIG. 1;

FIG. 6 is a plan view of part of the scales applied to the spindle casing and also the scales applied to the spindle thimble of the micrometer.

FIG. 7 is a view of part of the micrometer showing the anvils thereof positioned in a threaded member for measuring the inside diameter;

FIG. 8 is a side view of the micrometer with the anvils positioned in the threaded member shown in FIG. 7, said threaded member being shown in section to show the positions of the micrometer anvils;

FIG. 9 is a view similar to FIG. 7 showing the anvils of the micrometer positioned in a threaded member for measuring acme type threads;

FIG. 10 is a view similar to FIG. 8 showing the anvils provided to the micrometer for measuring acme type thread;

FIG. 11 shows the type of anvils provided to the micrometer for measuring the outside diameter of acme threaded member;

FIG. 12 is a side view of the anvils shown in FIG. 11 provided to the micrometer for measuring acme type thread;

FIG. 13 is a fragmentary view showing the anvils provided for measuring the lead angle of a thread;

FIG. 14 is a fragmentary view showing the anvils provided to the micrometer for measuring the helix angle of a thread; and FIG. 15 is a detail view showing the shape provided to one of the micrometer anvils whereby the anvil may be used for measuring both a right-hand and a left-hand thread.

Referring to the drawing in detail, reference numeral 10 designates a U-shaped micrometer frame having a hole 11 in one end 10a thereof for receiving the portion 12 of the spindle casing 13. The inner end of the portion 12 is threaded to receive the nut 14 whereby this portion of the spindle casing is held in the hole 11 with the shoulder 15 abutting the frame 10. The portion 12 of the spindle casing 13 is provided with a groove 11a which is adapted to receive the pin 10c that is positioned in the frame 10, whereby the casing 13 is properly aligned with respect to the frame 10.

The spindle 16 extends into the hollow 13a of the spindle casing 13 and the body of this spindle is threaded to engage the internal threads of the spindle collet 18 which is held inside of the outer end of the spindle casing 13 by set screws 19. The screws 19 are also used to the collet 18 against the threaded body of spindle 16 and thereby take up any backlash between the collet and the spindle. The spindle thimble 20 fits over the outside of the spindle casing 13 and it is attached to the spindle 16 by the set screw 17. The outer end part 20a of the spindle thimble is provided with a hole for receiving the spindle 16 and the outer surface of this end part 20a is threaded to receive the internally threaded lock cap 21. Outer surfaces of the spindle thimble 20 and lock cap 21 are knurled as shown in FIG. 2.

The cylinder 22 is slidable in and out of the sleeve 13. This cylinder is provided with a hole 22a extending longitudinally therethrough and the right-hand end of this hole is made of slightly larger diameter than the remaining part thereof. The small end part 16a of the spindle 16 extends into the hole 22a of the cylinder. The end of part 16a is threaded to receive the nut 23 and this threaded portion extends beyond the bushing 24 and bearings 25 and 26 which are fitted into the larger end part of the bore 22a of cylinder 22. The bushing 24 is friction fitted into the bore 22a and holds the bearing 25 therein. When the member 16a is inserted into the bushing 24 and bearings 25 and 26 and the nut 23 applied thereto the shoulder 22e engages the bearing 26. The threaded member 16a and the nut 23 positioned thereon hold the cylinder 22 assembled with the spindle 16 so that the cylinder 22 may be drawn into the hole 13a in the sleeve 13 by rotating the spindle thimble 20. The cylinder 22 is provided with a longitudinally extending groove 22d as shown in FIG. 4 and the set screw 22f extends in this groove to keep the spindle 22 from turning.

The cylinder 22 is provided with a head 27 to which the segment or anvil 28 is adapted to be pivotally attached by the pin 29 which extends through the hole 22b formed in the head as shown in FIG. 3. The pin 31 is pressed against the segment 28 by the spring 34a located in the neck 34 of the dial indicator 32 which is of conventional construction. The dial indicator 32 is provided with a neck 34 that extends into the hole 30 formed in the head 27 of the cylinder 22, and a set screw 33 is provided in the threaded hole of the head to engage the neck 34 of the dial indicator. Thus the dial indicator is held in a predetermined position on the head 27 such that the dial indicator is at zero when the segments or anvils 28 and 35 are against each other as shown in FIG. 1.

Anvil 35 is attached to the end part 10b of the frame 10 by screws 36 so that the part 35a of the anvil 35 is drawn into the recess 10d and aligning pin 37, which is held in a hole formed in the part 10b of the frame, extends into a hole formed in the part 35a of the anvil. If desired, the pin 37 may be fixedly positioned in the part 35a of the segment 35 and this pin may extend outward beyond the frame portion 10b. The outer part of pin 37 may be threaded and provided with a threaded cap. Thus in this modification the segment 35 is held attached to the frame part 10b and the screws 36 are eliminated since the pin 37 functions to draw the segment part 35a into the groove or recess 10d of the frame part 10b. The anvils 28 and 35 are provided with working surfaces 28b and 35b, respectively, for engaging internal threads, as shown in FIGS. 7 and 8. The anvil 28 is pivotally attached by the pivot pin 29 to the head 27 of the cylinder 22, as previously described. When this anvil 28 is moved away from the anvil 35 by turning the spindle thimble 20, the spring 34a and feeler 31 of the dial indicator press against the anvil 28 and tilt the working end 28b of this anvil away from anvil 35 a short distance.

When this micrometer is used for measuring inside threads of member 28 as shown in FIGS. 7 and 8, the working end 35b of anvil 35 is placed into the thread of the member 38. The anvil 28 is moved by rotating the thimble 20 to bring the working part 28b thereof into the thread in the opposite side of member 30. When the anvil 28 is moved away from anvil 35, it is slightly tilted on its pivot pin 29 by the spring pressure provided in the dial indicator 32 as previously described. At the same time, the indicator of the device 32 moves off of zero a certain amount, depending upon how much the anvil 28 was tilted. However, when the working part 28b of anvil 28 contacts the thread of member 38, then pressure is exerted on the anvil 28 and it is rotated on its pivot pin 29, thereby causing the indicator of 32 to move towards zero.

This micrometer is provided with several scales so that both inside and outside threads may be measured readily. The spindle thimble 20 is provided with graduations around the edge thereof and above these graduations there are positioned an upper and a lower scale. The upper scale is used in conjunction with the scales 39a and 39d provided to the spindle casing 13 when it is desired to measure inside diameters. The lower scale 39 of the spindle thimble and scales 39b and 39e of the spindle casing 13 are employed when it is desired to measure outside thread diameters. The numbers in scales 39a and 39b indicate tenths of an inch whereas the numbers in scale 39 designate thousandths of an inch. The graduations between the numbers of scales 39 are ten in number and thus the distance from zero to five of the scale 39 is divided into ten equal parts and each of these divisions is equal to 0.0005 inch. These small divisions may be further divided by the vernier scales 39d and 39e which cooperate with the grid 39c and these vernier scales are used in the conventional manner.

When the indicator 32 is at zero, the micrometer user reads the scale 39a shown in FIG. 6 used for inside thread measurements, and the upper scale 39 on the spindle thimble 20 in conjunction with vernier scale 39b positioned on the spindle casing 13 opposite grid 39c. Thus, by taking the reading from the micrometer scales when the indicator 32 is at zero, the operator is assured that he applies the same pressure to the anvils 28 and 35 in all measurements and, accordingly, the reading obtained from a certain member 38 taken by different operators of the micrometers will all be the same.

Different anvils may be readily applied to this micrometer and the anvils shown in FIGS. 9, 10, 11 and 12 are provided for measuring acme style threads. The anvils 28d and 35d are for measuring the internal thread 40a of the member 40, and the anvils 28e and 35e are provided for measuring the external threads 41a of member 41.

The thread engaging teeth of segment 35 are provided with slightly curved opposing faces such as the slightly curved opposing faces 42 and 43 shown on segment 35b in FIG 15. The purpose of giving the opposing faces slight curvature as shown is to enable the segment to be used for measuring both right-hand and left-hand thread accurately.

It will be noted that the anvil 28e FIG. 12 used for measuring the external thread is pivoted by pivot pin 29 positioned in hole 22c of the head 27. With the pivot pin 29 positioned in hole 22c, the pressure spring 34a in the dial indicator causes the anvil 28e to be tilted to the left, that is, toward the anvil 35e. Thus, in measuring the external thread of member 41, anvil 28e has to be backed off from this member before the member is placed between the anvils 28e and 35e. Anvil 28e is then moved toward the member 41 by rotating the thimble 20 and when it engages member 41, dial indicator 32 is moved toward zero. When indicator 32 is at zero, the operator of the micrometer takes a reading from the lower scale 39 of spindle thimble 20 and scales 39b and 39d of spindle casing 13 to obtain a measurement of the threads 41a of member 41.

This micrometer may be provided with segments 44 and 45 when the micrometer is to be used for obtaining the lead angle of the thread of member 49 shown in FIG. 13. This arrangement is used to determine whether or not the lead angle of the consecutive threads is uniform. For this purpose the segment 44 of the micrometer is inserted into one of the threads of the member 49 and the segment 45 is inserted into thread 46. A reading is then taken on the micrometer scales used for measuring outside diameters. With the micrometer segment 44 still positioned in the original thread, the segment 45 is moved to thread 47 and a second reading is taken. Thereafter, the micrometer segment 45 is moved to thread 48 and a third reading is taken. These readings are then compared to determine whether or not the thread lead angle is uniform.

Where it is desired to measure the angle of the thread helix, the micrometer is provided with segments 51 and 52 as shown in FIG. 14. In this case, the segment 51 is positioned in thread 54 of member 50 and the shoulder 53 of segment 52 is positioned on the end thread of member 50 while at the same time the end of segment 52 is positioned against the end of member 50 as shown. A reading is then taken off of the micrometer scales used for measuring outside diameters. Then without removing segments 51 and 53 from member 50, either the micrometer or the member 50 is rotated 180° and a second reading is taken. The difference between the first reading and the second reading is then used to determine the angle of the helix of the thread.

This micrometer using segments such as 28e and 35e shown in FIGS. 11 and 12 may be used for checking the uniformity of gear teeth by placing these segments on diametrically opposed teeth to obtain a reading and proceeding to take readings from teeth step by step around the circumference of the gear. Thus the uniformity of the teeth of the gear may be checked by observing the readings obtained on the scales of the micrometer used for outside diameter measurements.

What I claim is:

1. In a micrometer for measuring inside and outside diameters of threads, and other characteristics of threads, gear teeth and the like, the combination of a frame of substantially C shape having opposing arms, a segment having one end provided with work engaging surfaces, means attaching said segment to one of said arms so that said segment extends therefrom, a movable member, means supporting said movable member on the other of said arms, means moving one end of said member toward or away from said segment, a second segment, means pivotally supporting said second segment on said one end of said member so that it extends therefrom substantially parallel to said first mentioned segment, said second segment being adapted to be moved by said moving means so that work engaging surfaces thereof are adapted to be brought into engagement with surfaces of the work opposite to surfaces of said work engaged by said first mentioned segment, indicating means, means attaching said indicating means to said one end of said movable member, said indicating means having means engaging said second segment to indicate when said second segment is in predetermined alignment with said first mentioned segment.

2. In a micrometer for measuring inside and outside diameters of threads, and other characteristics of threads, gear teeth and the like, the combination set forth in claim 1 further characterized in that said indicating means comprises a dial indicator having a neck attached thereto, said attaching means for said indicating means comprises means gripping said neck in a hole in said one end of said movable member, said indicating means having actuating means engaging said second segment adjacent the pivot support thereof.

3. In a micrometer for measuring inside and outside diameters of threads, and other characteristics of threads, gear teeth and the like, the combination set forth in claim 1 further comprising resilient means, means supporting said resilient means on said member, said resilient means pressing on said second segment and tilting the work engaging end thereof toward the work.

4. In a micrometer for measuring inside and outside diameters of threads, and other characteristics of threads, gear teeth and the like, the combination set forth in claim 1 further characterized in that said first mentioned segment is removably attached to said one arm and said means pivotally supporting said second segment on said one end of said movable member comprises a pin extending into a hole formed in said movable member, said pin being positioned in a different hole in said movable member when the micrometer is provided with segments for inside thread measurements than when it is provided with segments for outside thread measurements.

References Cited by the Examiner

UNITED STATES PATENTS

| 874,197 | 12/1907 | Heym | 33—164 |
| 1,668,248 | 5/1928 | Olson | 33—167 |
| 3,090,126 | 5/1963 | Kernoski | 33—199 |

FOREIGN PATENTS

| 500,269 | 3/1954 | Canada. |

LEONARD FORMAN, *Primary Examiner.*

S. S. MATTHEWS, *Assistant Examiner.*